K. A. BLYSTAD.
WHEEL FOR POWER DRIVEN WINTER VEHICLES.
APPLICATION FILED DEC. 5, 1919.
1,351,992.
Patented Sept. 7, 1920.
2 SHEETS—SHEET 1.
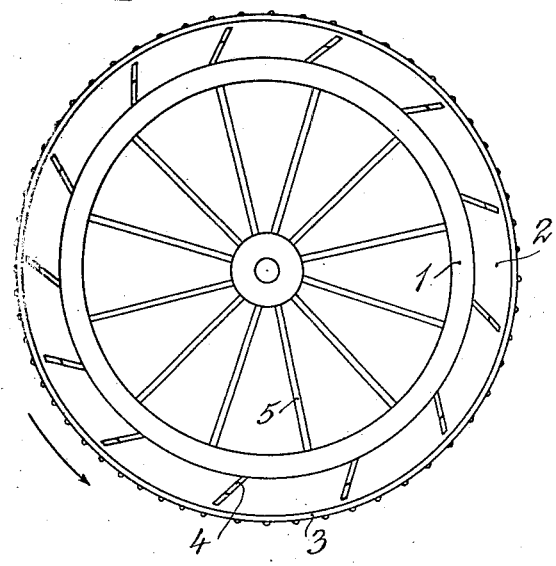
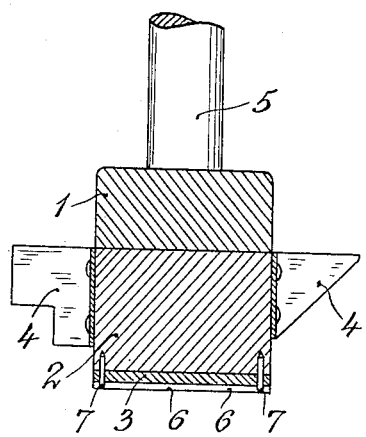
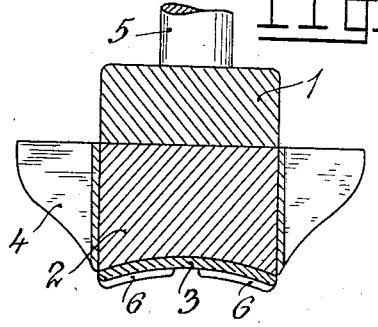
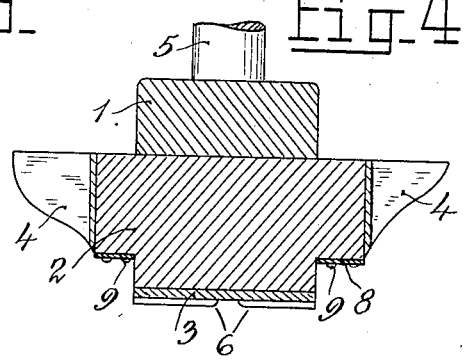
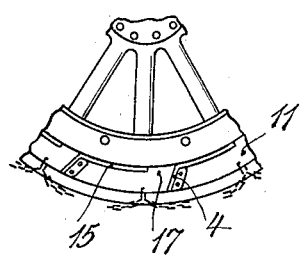
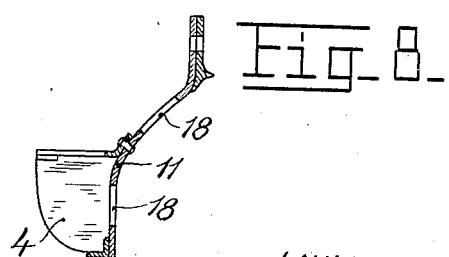
INVENTOR:
Karl August Blystad
By Wm Wallace White
ATTY.

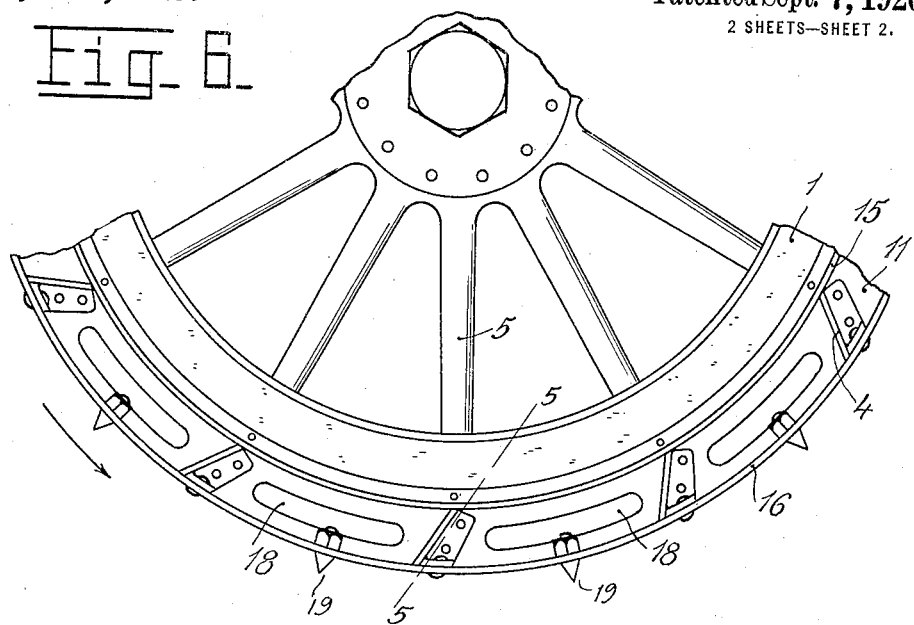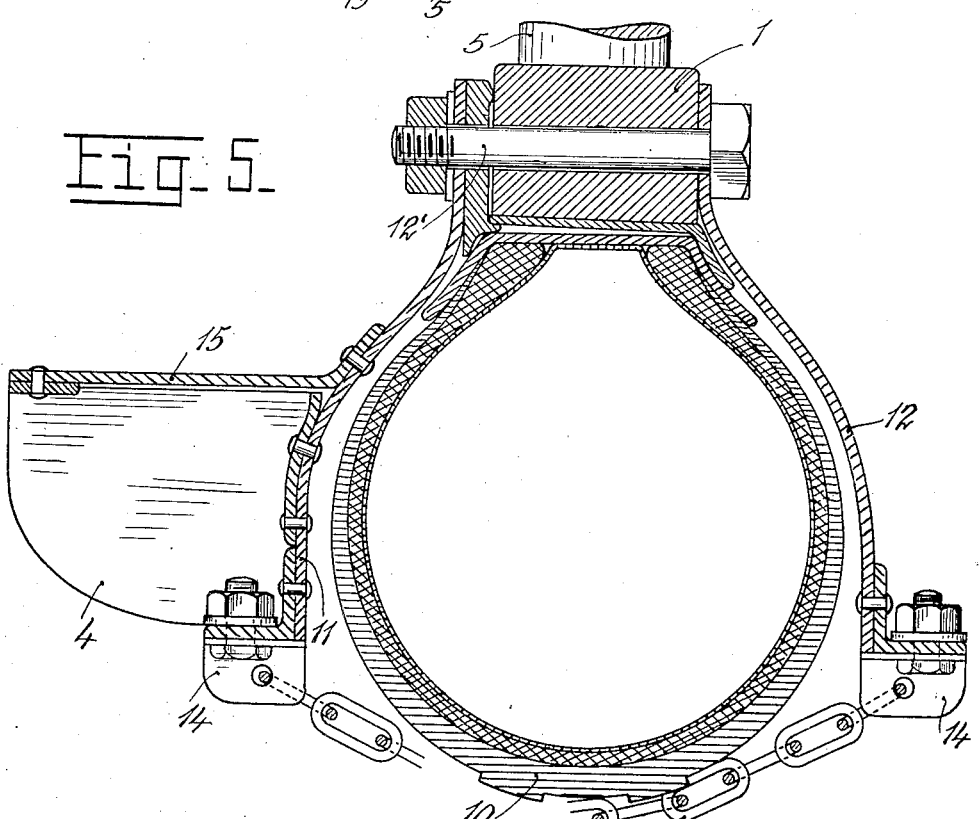

UNITED STATES PATENT OFFICE.

KARL AUGUST BLYSTAD, OF KONGSVINGER, NORWAY.

WHEEL FOR POWER-DRIVEN WINTER-VEHICLES.

1,351,992.  Specification of Letters Patent.  Patented Sept. 7, 1920.

Application filed December 5, 1919. Serial No. 342,799.

*To all whom it may concern:*

Be it known that I, KARL AUGUST BLYSTAD, a subject of the King of Norway, residing at Kongsvinger, Norway, have invented certain new and useful Improvements in Wheels for Power-Driven Winter-Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in traction wheels for power driven vehicles, the object of the invention being to provide a traction wheel which is adapted for use on soft roads or in snow, one of the essential features of the invention being to provide in combination with a traction wheel, a plurality of gripping members arranged at an angle to the radius of the wheel and so formed as to present gripping surfaces of increased width as the wheel sinks deeper into the road or snow.

With the foregoing and other objects in view, which will appear as the description proceeds, the invention consists in the novel features of construction and combination of parts which will be more fully described hereinafter, and particularly pointed out in the claims.

In the drawings accompanying and forming part of this specification,

Figure 1 is a diagrammatic side elevation of one form of wheel provided with gripping means constructed in accordance with the present invention;

Figs. 2, 3 and 4 are sectional views, on a larger scale, through the felly of a wheel and illustrating different forms of the improved gripping devices;

Fig. 5 is a sectional view through the rim of a wheel provided with a pneumatic tire and illustrating my improved gripping device in a modified form for application to said pneumatic tire, the section being taken approximately on the line 5—5 of Fig. 6 and on an enlarged scale;

Figs. 6 and 7 are fragmentary side views of a wheel similar to that shown in Fig. 5 and provided with the improved gripping devices and illustrating different ways of connecting said devices together, the chains 13 and their carrying lugs 14 being omitted in Fig. 6; and Fig. 8 is a detail sectional view of a portion of the gripping device adapted for use in connection with pneumatic tires.

Similar characters of reference designate the same parts in the different figures of the drawings.

Referring to Figs. 1 to 4 of the drawings, 1 designates the usual inner felly or rim of the wheel and 2 the outer felly, which is preferably so constructed as to be readily detachable from the inner felly, it being shown herein secured thereto by means of a metal rim or band 3, the outer tread surface of which may be of straight cross-section, as shown in Figs. 2 and 4, or of concave cross-section, as shown in Fig. 3. The metal rim or hoop 3 may also be provided with transverse ribs 6, which may either extend entirely across the face of the rim, as shown in Fig. 2 or be separated as shown in Figs. 3 and 4. The rim may also be provided with steel gripping points or nails 7, as shown in Fig. 2.

In Fig. 4, the periphery of the felly 2 is shown of step formation, as illustrated at 8, whereby is provided, in addition to the metal tread face 3 a pair of tread surfaces, one at each side of the tread surface 3, in a different horizontal plane from that of the tread surface 3, these tread surfaces being provided with gripping points 9. By reason of this construction, when the wheel has a tendency to sink on soft roads, the surfaces formed by the steps 8 offer greater resistance to sinking and thereby tend to increase the carrying capacity of the wheel in a manner which will be readily understood.

Secured to the side of the fellies 2 are a plurality of gripping devices 4, which are of L-shaped cross-section, one flange thereof being secured to the fellies 2 and the other extending out at right angles to the felly, as clearly shown in Fig. 2. One of the essential features of this invention is that the gripping members or vanes shall present toward the road a gripping surface of increased width as the wheel sinks. This object may be accomplished by forming the lower edge of the outwardly extending flange of the vane in a number of different ways. For instance, at the left side of Fig. 2 the lower edge of this flange is shown of step formation, while at the right side of this figure it is shown as an inclined surface. Again, in Fig. 3 it is shown both at the right and left of the figure of approximately ogee formation. And so in Fig. 4 it is again shown at both sides of the figure as of approximately ogee formation. In all of these forms it will readily be seen that as the wheel sinks into the road it presents a gripping surface of gradually increased width. It will be understood that the gripping devices may be applied at one or both sides of the fellies, as desired, and may be of one form at one side and of another form at the oposite side, as shown in Fig. 2, or of the same form at both sides, as shown in Fig. 3. It will also be understood that the gripping edge of the member 4 may be of any suitable form that will present toward the road a gripping surface of increased width as the wheel sinks. The gripping devices are preferably secured to the side of the felly in such a position that they are at an angle to the radius of the wheel, as clearly shown in Figs. 1, 6 and 7, in order to give them a better grip or "bite" on soft roads or snow.

The wheel so far described is a solid traction wheel provided with a metal rim. My improved gripping devices, however, are applicable also to wheels having rubber tires, either solid or pneumatic. In Figs. 5, 6 and 7 is shown an embodiment of the device as applied to a pneumatic tire, while in Fig. 8 is illustrated a portion of the device in detailed sectional view. In this form of the device I provide a pair of annular offset members 11 and 12, which may be clamped to the felly 1 of the wheel by means of bolts and nuts passing transversely through said felly, as shown at 12' in Fig. 5, the members 11 and 12 having secured at their lower ends a pair of perforated ears or lugs 14 at certain intervals, to which lugs may be secured short antiskid chains 13, in order to assist the pneumatic tire 10 in gripping the surface of the road. In this instance the gripping devices 4 are secured to the members 11 and 12, or to only one of these members, as shown in Fig. 5 at the left-hand side of the figure. In order to increase the carrying capacity of a pneumatic carried wheel in deep snow, the veins may be interconnected by means of ribs 15,—16, extending parallel to the tread surface of the wheel and connecting the veins 4 at their upper and lower edges respectively, as shown in Figs. 5, 6 and 8. As shown in Fig. 5, the members 15 and 16 are of angular form in cross section, one flange of each of said members being secured to the side member 11, while the horizontal portions or flanges of the members 15 and 16 are secured to ears formed respectively at the upper and lower edges of the member 4, as shown in cross-section in Fig. 5. One of these interconnecting members may be omitted, if desired, as illustrated in Fig. 7, wherein the member 16 is omitted, and, as also shown in said figure, the member 15, may, instead of extending the entire distance from one gripping member 4 to the other, stop short of such distance thereby to provide a space 17 through which the snow may pass. In Fig. 5 the lugs 14 are shown secured by means of bolts and nuts to the horizontal or tread flange of the member 16, so that said lugs and the chains carried thereby may be readily removed when not needed. The tread flange of the member 16 may be further provided with gripping points 19, each of which may have a threaded stem passing through an opening in said flange and engage with a nut on the upper side of said flange, as shown in Fig. 6. In this form of the device it is desirable to provide for the escape of any snow or other material which may be forced up between the pneumatic tire 10 and the members 11 and 12, and for this purpose I have provided these members with elongated slots 18, as shown in Figs. 6 and 8.

While I have described in detail the structure herein illustrated, it is to be understood that I do not thereby limit my invention to the precise features of construction shown, as I am aware that many mechanical changes and modifications may be made therein without departing from the scope of the claims appended hereto.

Having thus described my invention, what I claim is:

1. In a device of the kind described a supporting plate adapted to be secured to the side of a wheel felly and having a portion projecting outwardly of the periphery and offset laterally therefrom, and a traction plate consisting of an angle plate having its flanges disposed at right angles, one of said flanges being secured to the offset portion of the supporting plate and the other flange being substantially triangular in form with its apex toward the periphery of the wheel and projecting laterally away from said supporting plate.

2. In a device of the kind described a supporting plate adapted to be secured to the side of a wheel felly and having a portion projecting outwardly of the periphery and offset laterally therefrom, and a traction plate consisting of an angle plate having its flanges disposed at right angles, one of said flanges being secured to the offset portion of the supporting plate and the other flange being substantially triangular in form with its apex toward the periphery of the wheel and projecting laterally away from said supporting plate and reinforcing flanges extending outwardly from the supporting plate above and below the traction plate.

In testimony that I claim the foregoing as my invention, I have signed my name in presence of two subscribing witnesses.

KARL AUGUST BLYSTAD.

Witnesses:
A. B. COOK,
A. NAT. HEDENSCHAN.